United States Patent [19]
Curry

[11] Patent Number: 5,382,967
[45] Date of Patent: Jan. 17, 1995

[54] CONTINUOUSLY TUNABLE RASTER RESOLUTION PRINTING

[75] Inventor: Douglas N. Curry, Menlo Park, Calif.

[73] Assignee: Xerox Corporation, Stamford, Conn.

[21] Appl. No.: 535,629

[22] Filed: Jun. 11, 1990

[51] Int. Cl.6 .............................................. H04N 1/21
[52] U.S. Cl. ..................................... 346/108; 358/296
[58] Field of Search ............... 358/451, 474, 479, 480, 358/481; 315/368 N, 368 R, 368 C, 366; 346/108, 1.1, 107 R, 110 R

[56] References Cited

U.S. PATENT DOCUMENTS

| | | | |
|---|---|---|---|
| 4,227,117 | 10/1980 | Watanabe et al. | 315/366 |
| 4,417,184 | 11/1983 | Takesaka et al. | 315/366 |
| 4,613,877 | 9/1986 | Spencer et al. | 346/108 |

*Primary Examiner*—Mark J. Reinhart
*Attorney, Agent, or Firm*—Robert E. Cunha

[57] ABSTRACT

A circuit for using a flying spot scanner of one scan density to produce rasters of a different density in the process direction by using a fractional number of scans per raster. In the usual case, where m scans will be used to create n rasters, the number of scans m will normally be greater than the number of rasters n. Then, there will be m/n scans per raster. This will necessitate dividing some scans into two parts, the first part of the scan being used to scan the video data of the previous raster and the second part of the scan being used to scan the data of the next raster. Therefore, a circuit for switching data to each scan from one line of data to the next as the scan transitions from one raster to the next is required in this system. A process direction encoder can be used to determine when the raster boundaries are reached, and therefore when the data is to be switched.

2 Claims, 2 Drawing Sheets

CONTINUOUSLY TUNABLE RASTER RESOLUTION PRINTING

BACKGROUND OF THE INVENTION

This is a circuit for allowing a fractional number of scans to be used to expose each data raster in a raster output scanner (ROS), and more specifically is a circuit for allowing a single scan to start with video data from one raster, and switch at any point to the data of the next raster.

In the simplest case a raster output scanned device has one scan per raster. An example is a scan generated by a rotating polygon which is used to scan an image onto a photoreceptor. At the start of scan (SOS) one line of video is clocked out and used to modulate the beam intensity to produce one raster. It is also possible to use two or more scans for each raster in this case the video for all of the scans in a raster is identical.

A problem arises when the scan and raster pixel densities required are not multiples of each other. Assume, for example, that a 240 spot per inch video generator is being used to drive a 350 spot per inch printer. In the scan direction, the clock speed of the video can be varied to match the scan speed to result in the proper image width. However, in the process direction, matching the video rate to the printer's number of scans per inch is a very difficult process. The number of scans per inch at the printer is normally not variable so the only method is to convert the video electronically, in this example, from 240 to 350 scans per inch. This can be done by converting the entire image to a continuous gray scale image using some numerical process, and then converting that continuous image into the desired 350 scan lines per inch. Of course, in the process, much computer time and memory is consumed, and there is inevitably a loss of detail.

A better method of making a fractional adjustment in the number of scan lines per inch is required.

SUMMARY OF THE INVENTION

This invention proceeds from the concept that there can be a fractional number of scans per raster. For example, in a system where the ROS produces eight scans in the time the data generator takes to produce three data lines, or rasters, then the system can assign 2⅔ scan lines for each raster. In other words, the same data will be sent to the ROS for the first two lines. For the third line, the first raster data will be used for the first two thirds and the second raster data will be used for the last third of the third scan. Next, the second raster data will be used for the next 2⅓ lines. Finally the third raster data will be used for the last two thirds of the sixth scan line and for the next two entire scan lines. In this way, three equal rasters have been printed from eight scans.

This technique can also be used where there are more rasters than scans. For example, two scans can be used to generate three rasters by allowing each scan to generate two thirds of a raster. Of course, some data will be lost.

This technique can be used to divide any scan at any point, and therefore can be used to divide a scan speed by any fractional number to match any raster width in the process direction, without numerical adjustments of any kind having to be made to the data.

DETAILED DESCRIPTION OF THE INVENTION

Flying spot scanners, also known as raster output scanners, conventionally have a reflective, multifaceted polygon which is rotated about its central axis to repeatedly sweep one or more intensity modulated light beams across a photosensitive recording medium in a fast scan, or line scanning, direction while the recording medium is being advanced in an orthogonal slow scan, or process, direction, such that the beam or beams scan the recording medium in accordance with a raster scanning pattern. Digital printing is performed by serially intensity modulating each of the beams in accordance with a binary sample stream, whereby the recording medium is exposed to the image represented by the samples as it is being scanned.

As is known, the quality of the image printed by a digital printer depends to a substantial extent upon the precision with which the individual picture elements, pixels, of the printed image are positioned on the recording medium. In the process direction, the spacing of scan lines must be precise in order to produce halftone images which are free of artifacts caused by polygon facet wobble, cogging of the process gear train, process motor speed variation, or other process anomalies which contribute to unequal spacing of scans.

Typically, a start of scan detector is used to synchronize the flying spot or spots to the data rasters, and one raster of data is output for each scan by each spot. With each new SOS signal, a particular raster is output. With some scanning schemes, such as "line doubling", or "line tripling", a particular data raster is output two or more times during the two or more scans. This has the advantage of blurring out some polygon wobble, but has the disadvantage of requiring a polygon RPM two or three times that which would normally be required. Moreover, data raster separation is limited to integer multiples of the scan separation, precluding the ability to do either velocity compensation or density control except at a relatively coarse (scan spacing) resolution.

The invention proposed here will provide velocity compensation and raster density control on arbitrarily fine resolution in the process direction, and relies on the disassociation of the start of scan signal from the transfer of modulation from one data raster to the next, and instead, uses the spatial position of the exposure medium to determine which raster is to be output. Instead of beginning and ending each raster during the "flyback" portion of the fast scan, transfer to the next raster may be initiated during a scan.

Figure 1:
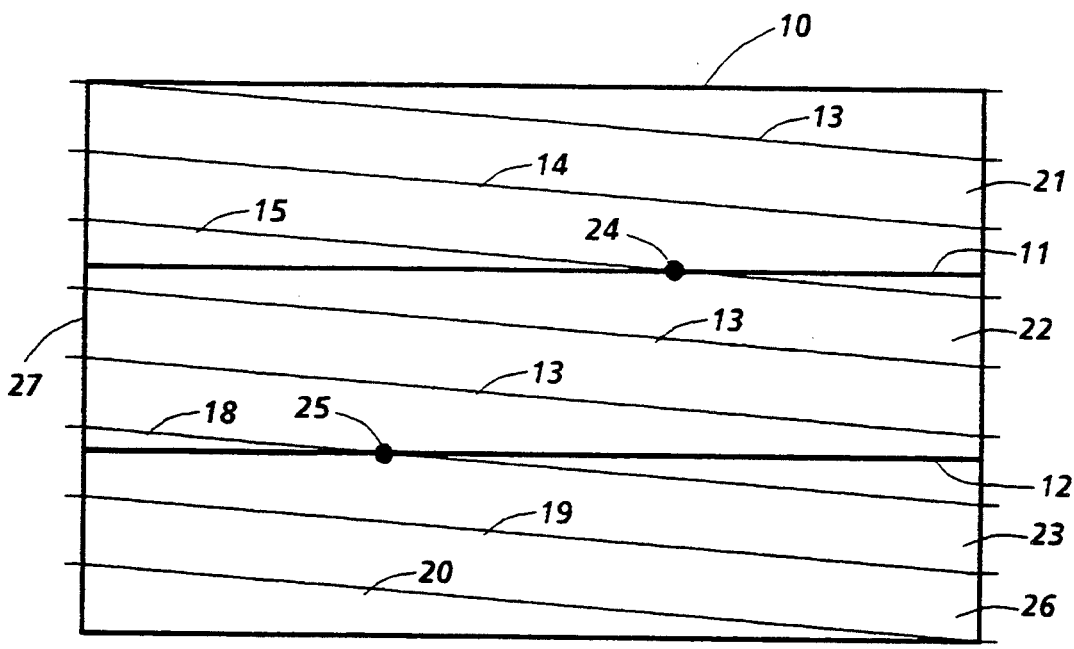
FIG. 1 is a diagram showing eight scans being used to produce three rasters.

An example of this variable relationship between scans and rasters shown in FIG. 1. Assume a rectangular area of the photoreceptor bounded on the left side by the line defining the start of scan 27, and the line defining the end of scan 26. Also, the rectangle comprises the top three rasters of the image, rasters 21, 22 and 23. Now assume scan lines 13 through 20 having a frequency such that 8 scans will cover the three rasters.

Now, in accordance with this invention, the image data for the first raster will be supplied to the entire first scan 13, the identical data will be supplied to the second full scan 14, and the same data will be supplied to the third scan 15, but only for the first ⅔ of the scan. At point 24 a transition will occur and the data will be switched over to raster 22 data. If, for example, the first raster 21 is white and the second raster 22 is black, then white pixels will be supplied to scans 13 and 14 and to the first two thirds of scan 15. At the transition point 24, the image data will be switched, and thereafter black pixels will be supplied to the remainder of scan 15, to all of scans 16 and 17 and to the first third of scan 18.

It can now be seen that this technique can be used to match any number of scans to any number of data rasters while maintaining the absolute accuracy of every raster dimension in the process direction. Not only will this technique adapt a particular scan speed to a different raster density, but it will also compensate for process speed variations, since the actual position of the rasters, and not the nominal amount of time between rasters, can be the mechanism by which the start of each raster is determined.

As can be appreciated, switching from one data raster to another in the middle of a scan may cause visual artifacts without the presence of some sort of compensating technique. These artifacts can be described as the beating of the raster frequency with the scan frequency. By increasing the umber of scans per raster, these high frequency artifacts may be blurred as in the case of scan doubling or tripling.

It is not necessary to increase the polygon rotation rate to increase the number of scans per raster. Indeed, this may be prohibitive in cost. An alternate way is to provide multiple spot scanning with an electronic raster cache memory which contains the last n rasters output, where n is the number of rasters spanned by the multiple spots instantaneously on the exposure medium plus one. As each point on the exposure medium passes under the space occupied by a particular scanning beam, the raster associated with that position is output regardless of polygon angular velocity or phase.

Figure 2:
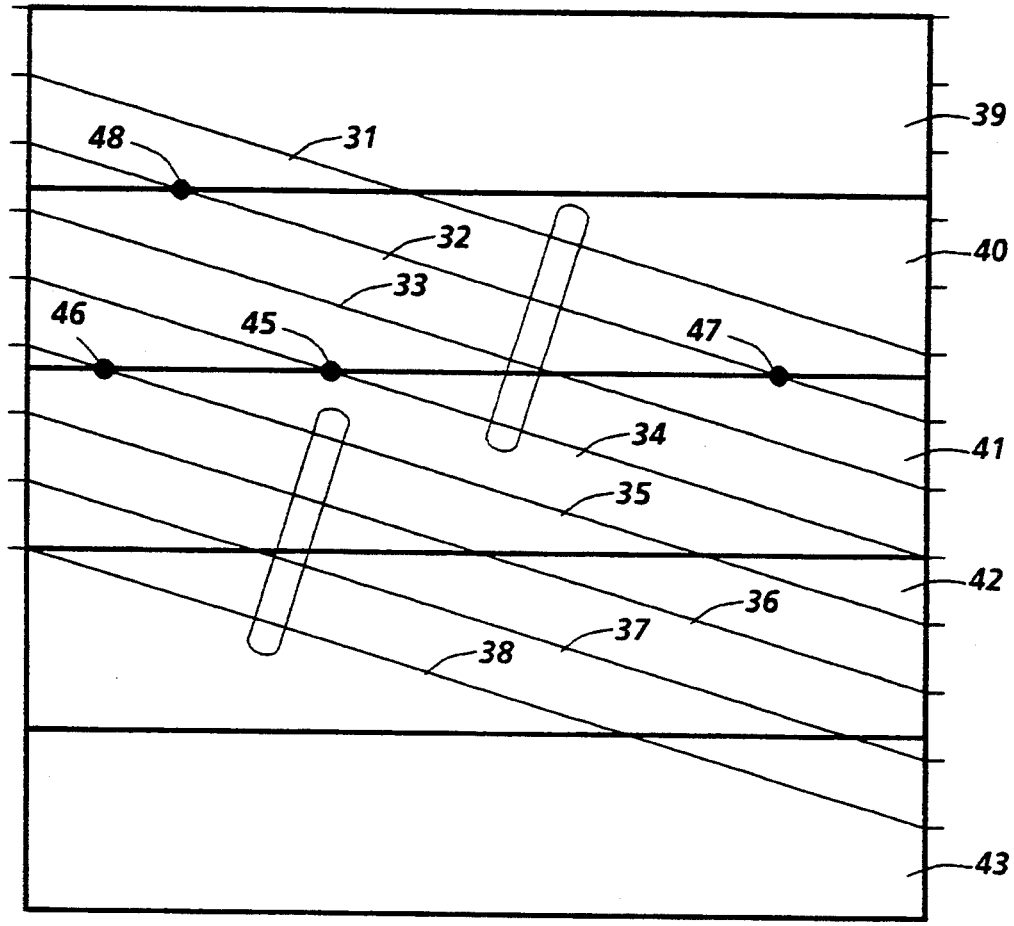
FIG. 2 is a diagram showing the process for generating rasters by a beam generator which generates four beams at the same time.

FIG. 2 shows such a system having four spots scanning the photoreceptor at the same time. Note that the spacing between beams has been set to one scan for simplicity in explanation, although it will be assumed that the beam spacing may be set to any desired value, for instance three, in which interlacing would be used to fill in the exposure. The first set of spots 31–34 scans the photoreceptor as shown, followed by the next scan with spots 35–38. In the worst case one set of spots will enter four rasters, as shown by the second set comprising spots 35–38, which enter parts of rasters 40–43. Therefore, including one extra raster buffer to receive a new raster, the data generator must have a raster buffer holding at least five rasters of data. The first spot travels through parts of rasters 40, 41 and 42 while the last spot 38 also enters raster 43. As each spot reaches the raster boundary, for example at points 48 and 44, the video to the spot will be switched, here from raster 39 to raster 40.

In a conventional ROS, if not tilted, the rasters are parallel to the scans, which are slightly diagonal, since the exposure medium moves a distance as the spot is moved horizontally. In contrast, for the invention described here, the rasters are horizontal as the boundaries between rasters are now dependent on exposure medium position rather than scan number. A particular raster will be composed of the sum of the exposures from each of the spots in the multiple beam system. By controlling the rate at which rasters are incremented as the spots pass over the recording medium, variable density at arbitrarily high resolution may be achieved.

A particular artifact that will occur in an image generated by this system is caused by switching from one raster to another while in the middle of a scan. If this were to occur only once during the printing of an image, the artifact might be invisible, overwhelmed by the random noise in the image. However, this switching might occur once per raster for each beam, and, if the process speed is uniform at one raster per scan, the switching with occur at the same horizontal position during each scan, producing an easily recognizable vertical artifact down the length of the image. In practice, however, the process is not constant, but varying, and is speeding up or slowing down in a more or less erratic sinusoidal manner, which causes the vertical artifact to be distended to the left or right in an equally erratic manner, producing an artifact which runs in an undulating line down the image. A process for eliminating this artifact will be described below.

To determine where the transition points should be if it is desired to achieve motion control, a rotary encoder, or other velocity or position measuring device, may be attached to the exposure medium as a means to determine process velocity. The pulses produced by such a device may be used directly as an indication of process position, but only if the desired raster density matches the density of the encoder. More likely, however, there will be fewer pulses per process inch emitted from the measuring device than there are rasters per inch, for reasons of economy. In order to produce a raster clock, a clock with a frequency of one cycle per raster, with a frequency proportional to the process velocity, some sort of frequency multiplication is necessary.

One way to produce such a multiplied clock is to use a frequency synthesizer based on arithmetic, see U.S. Pat. No. 4,766,560, "Parallel/Pipelined Arithmetic Variable Clock Frequency Synthesizer", for teachings on the basic frequency synthesis technique, and U.S. Pat. No. 4,893,136. "Arithmetically Computed Motor Hunt Compensation for Flying Spot Scanners" for a discussion of fast scan compensation which uses a computation technique similar to the one used here. For slow scan positioning errors, such a method may be used to produce a raster clock at any desired nominal raster density, with frequency variations designed to produce rasters of constant density on the recording medium. An important aspect of this frequency synthesis technique is that numbers are used to generate frequencies, and phase shifts may be generated by appropriate modification of these numbers through arithmetic techniques.

Referring to the artifact previously mentioned, it is apparent that such a problem exists to the extent that the switching of rasters from scan to scan produces a trail which the eye can easily follow down the page. To alleviate this problem, a pseudo-random set of numbers may be employed to offset, either to the left or right in equal probability and differing amounts, the horizontal position at which the switch takes place, destroying the visible trail in the process. While this adds high frequency noise to the system, it also maintains low frequency position integrity by insuring that the sum of the amounts of the pseudo random phase shifts is zero over a small distance. Refer to U.S. patent Ser. No.

07/288,526, "Pseudo-Random Phase Shifted Arithmetic Bit Clock Generators for Digital Printers" for a discussion on how this technique was successfully applied to a similar problem in the fast scan direction.

In this invention, two significant tradeoffs are being made. First (although a single beam system theoretically may be used), a multiple spot scanning system can be used for raster density and/or process control with closer scan spacing rather than higher speed printing. Each spot is being modulated by the entire contents of the source data file, not a fraction as in conventional interlacing. Since each square inch of recording medium is being exposed once per beam, lower exposure levels per beam are required. Second, artifacts at low exposure levels and a high frequency are being accepted as the cost of eliminating low frequency artifacts caused by the beating of the raster frequency with the scan frequency. This tradeoff is acceptable, however, since it is the goal of this correction technique to make the artifact frequency so high and exposure level so low as to be outside the perception range of the observer. The recording medium receives the superposition of the multiple exposures produced by multiple spots. Although the data in the rasters will overlap perfectly in the fast scan direction, any artifacts which exist only in one single exposure will not be superimposed. For example, for a four beam system, there will be four different transition points per raster, each at one fourth intensity than with one beam.

Due to physical limitations of scanner technology, most printers are built to perform at a particular bit density. It is generally not feasible to use a data file already halftoned or formatted to a particular density on a printer designed for a different density since the image will physically be enlarged or minified in accordance with the fixed density of the printer. For example, and $8\frac{1}{2}"\times 11"$ file at 300 by 300 pixels per inch would be $6.4"\times 8.3"$ when printed on a 400 spi printer. Parallel printing methods such as diode arrays, with fixed spacing of printing elements in the fast scan direction, are able to vary density only in the slow scan direction. Polygon scanners, although quite able to vary density in the fast scan direction, have had a fixed density imposed by the unalterable separation of rasters in the slow scan direction. It should be noted that varying the speed of the polygon to achieve variable slow scan density has proved unsuccessful in the past in part due to the time it takes the polygon to servo to the appropriate speed. With this invention, it will be feasible to print files formatted for a wide variety of densities on the same printer. Indeed, it is quite possible to merge data of different densities onto the same image.

In the past, process speed variation, such as that caused by gear cogging, sun gear runout, and process motor speed variation, have been an impediment to high quality reproduction. Other problems such as polygon wobble, or color pass registration in color printers affect the quality of the reproduction. Usually, these problems have been solved by providing gear trains, motors, and mechanical parts of such high quality that these problems are reduced to an acceptable level, but this may have a high cost associated with it. By monitoring the process speed and/or position in real time, and sending this information back to the density control electronics, these problems may be alleviated to some extent by this invention, depending on the accuracy and resolution of the process speed and position information.

Figure 3:
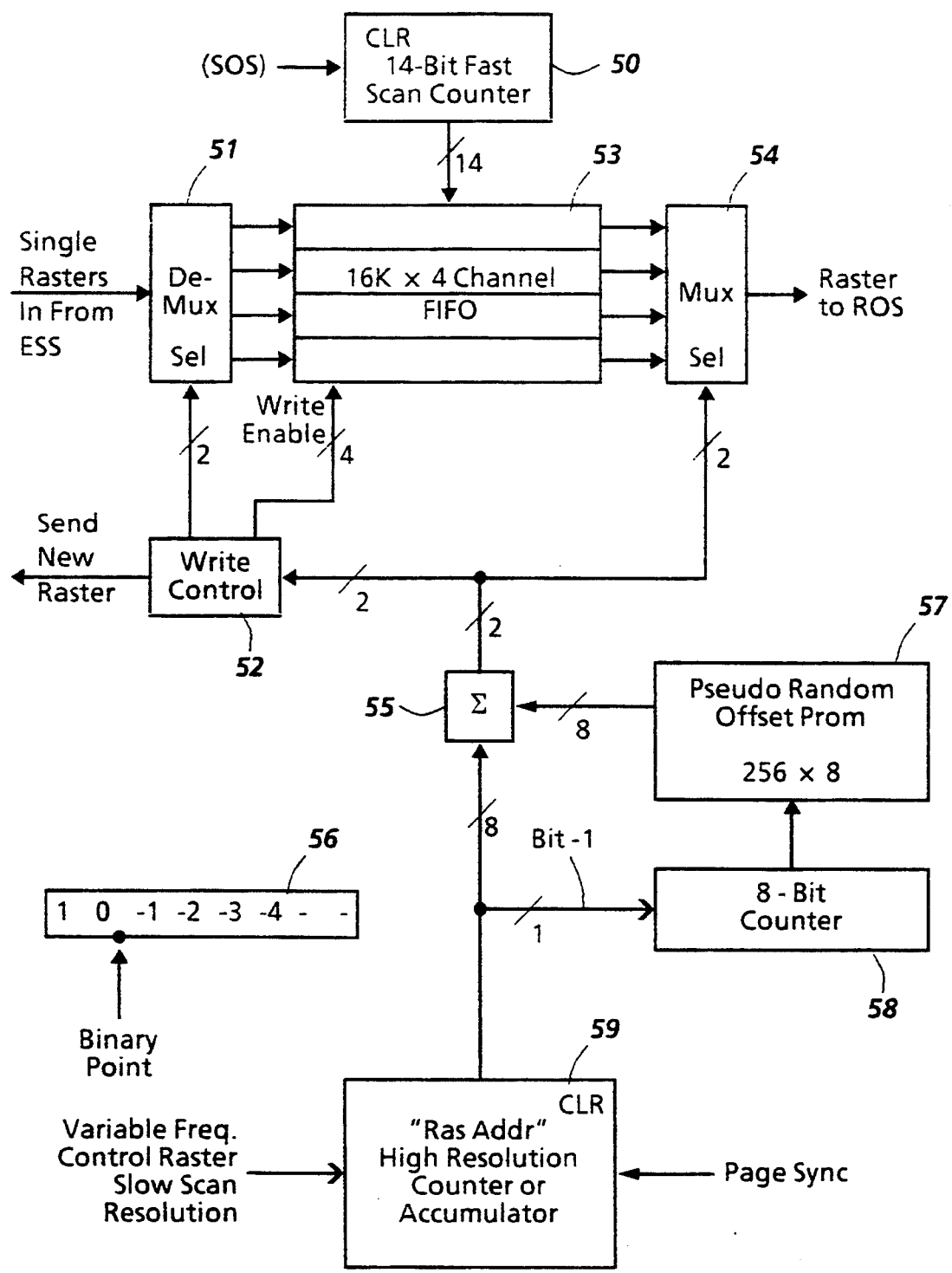
FIG. 3 is a block diagram of a circuit for implementing this circuit.

A schematic diagram of the inventive circuit is shown as FIG. 3. At the start of operation the four lines of memory in RAM 53 are loaded from the video generator through a demux 51 with the video data representing the first four rasters of the image to be output to the photoreceptor. A start of scan signal is received by the pixel clock generator 50 which starts a 14 bit counter, the output of which is used to address the four channels of memory 53, each channel comprising a line of video representing one raster to be printed. All four lines of output are sent to the mux 54. The summer 55 is originally set to 0 thereby selecting the first raster to be output from the mux 54. At the start of the second scan the second SOS signal will be received and the counter 50 restarts from zero. The first raster will continue to be output on this second, and subsequent scans, until the mux 54 is controlled to select the second raster, which will happen as follows.

Completely asynchronous to the frequency of the scan speed, an encoder can be used to measure the process speed, and to output a number of pulses per raster, applied to the input of the raster counter 59. On the other hand, the variable frequency can be supplied by a frequency synthesizer set to a particular frequency, which is equivalent to calculating where rasters should be placed, achieving no motion control. For a third possibility, an accumulator may be used generating RasAddr (56) directly, either being a function of the motion or not, depending on whether or not the frequency determining parameter of the accumulator (the number being accumulated) is varied as a function of the motion. In any case, the bits of the counter or accumulator to the left of the decimal point represent the raster number, and the bits to the right, shown as $-1$, $-2$ etc, represent fractions of a raster. In the simplest case, the two bits to the left of the decimal place could be sent to the mux 54.

The problem with this circuit is that the artifacts may form a visible pattern if they occur at the same place on the scan line for a number of consecutive scans. To hide this line of artifacts, each transition point can be moved a small random distance to the left or right, blurring it to the point where it is no longer visible. This is accomplished by using the $-1$ bit of the raster address counter 59, the count of which is shown as RasAddr 56, to clock an 8 bit counter 58. The eight bit output is used to address RAM 57 which outputs a random offset in the form of a binary number. This random number and the counter 59 output are summed in summer 55, and the resultant two bits to the left of the decimal place are used to switch rasters instead of the original two bits of the raster address counter 59. The result is that the raster switching point becomes slightly random, and therefore invisible.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a raster output scanner, apparatus for using m scanning beams, numbered from 0 to m−1 from top to bottom, to scan a beam receptor n rasters long in the process direction comprising, means for generating m evenly spaced scanning beams at the same time and for scanning said m beams across said receptor at the same time, means for moving said receptor in the process direction, means measuring the distance traveled by said receptor and for generating a signal each time said receptor has advanced a distance equal to 1/nm times the receptor length, and means for switching the video data to each of said beams, one at a time, from the last raster to the next raster as each signal is generated, in the following order, from beam m−1 to beam 0.

2. In a raster output scanner, apparatus for using a scanning beam to scan a beam receptor n rasters long in the process direction comprising, means for moving said receptor in the process direction, means for measuring the distance traveled by said receptor and for generating a signal each time said receptor has advanced a distance equal to 1/n times the receptor length, means for advancing or delaying the time of said signal by a random amount of time, but less than the time of one scan, and means responsive to the advanced or delayed signal for switching the video data sent to said scanning beam from the last raster video to the next raster video.

* * * * *